(12) United States Patent
Nielsen

(10) Patent No.: US 11,078,884 B2
(45) Date of Patent: Aug. 3, 2021

(54) DETERMINING WIND DIRECTION OFFSET USING YAW EVENTS

(71) Applicant: VESTAS WIND SYSTEMS A/S, Aarhus N (DK)

(72) Inventor: Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 194 days.

(21) Appl. No.: 16/314,000

(22) PCT Filed: Jun. 29, 2017

(86) PCT No.: PCT/DK2017/050218
§ 371 (c)(1),
(2) Date: Dec. 28, 2018

(87) PCT Pub. No.: WO2018/001433
PCT Pub. Date: Jan. 4, 2018

(65) Prior Publication Data
US 2019/0170116 A1 Jun. 6, 2019

(30) Foreign Application Priority Data

Jun. 30, 2016 (DK) .............................. PA201670480

(51) Int. Cl.
*F03D 7/02* (2006.01)
*F03D 17/00* (2016.01)
(52) U.S. Cl.
CPC ........... *F03D 7/0204* (2013.01); *F03D 17/00* (2016.05); *F05B 2270/321* (2013.01);
(Continued)

(58) Field of Classification Search
CPC .............................. F03D 7/0204; F03D 17/00
See application file for complete search history.

(56) References Cited

U.S. PATENT DOCUMENTS 7,952,215 B2 * 5/2011 Hayashi ................ F03D 7/0204
290/44
8,476,780 B2 * 7/2013 Hashimoto ........... F03D 7/0204
290/44

(Continued)

FOREIGN PATENT DOCUMENTS

CN     101498282 A    8/2009
CN     101568721 A   10/2009
(Continued)

OTHER PUBLICATIONS

Patent Cooperation Treaty International Search Report for Application No. PCT/DK2017/050218 dated Sep. 14, 2017.
(Continued)

*Primary Examiner* — David E Sosnowski
*Assistant Examiner* — Wesley Le Fisher
(74) *Attorney, Agent, or Firm* — Patterson + Sheridan, LLP

(57) ABSTRACT

A wind turbine includes a wind direction sensor, a yawing system, and a control system for yawing the wind turbine rotor relative to the wind. The control system measures a wind direction parameter by the wind direction sensor Over time a group of data sets is obtained and a wind direction offset is determined from the group of data sets which is used to adjust the wind direction parameter. The adjusted wind direction parameter is then used in the controlling of the wind turbine.

20 Claims, 4 Drawing Sheets

(52) U.S. Cl.
CPC ... *F05B 2270/329* (2013.01); *F05B 2270/802* (2013.01); *Y02E 10/72* (2013.01)

(56) References Cited

U.S. PATENT DOCUMENTS

| | | | |
|---|---|---|---|
| 8,546,967 B2 | 10/2013 | Ormel et al. | |
| 9,982,656 B2* | 5/2018 | Li | G01B 21/22 |
| 10,012,209 B2* | 7/2018 | Andersen | F03D 1/0691 |
| 2007/0183885 A1 | 8/2007 | Ormel et al. | |
| 2015/0086357 A1* | 3/2015 | Gregg | F03D 7/046 416/1 |
| 2017/0284375 A1* | 10/2017 | Nielsen | G01P 13/02 |

FOREIGN PATENT DOCUMENTS

| | | |
|---|---|---|
| CN | 102089516 A | 6/2011 |
| CN | 102865191 A | 1/2013 |
| CN | 101387267 B | 5/2013 |
| CN | 101660492 B | 4/2014 |
| CN | 103726694 A | 4/2014 |
| EP | 276721 A1 | 8/1988 |
| EP | 2375060 A1 | 10/2011 |
| EP | 2154362 A1 | 2/2012 |
| EP | 2626549 A1 | 8/2013 |
| JP | 2008095664 A | 4/2008 |
| KR | 101324576 B1 | 11/2013 |
| WO | 2005093435 A1 | 10/2005 |
| WO | 2012153185 A1 | 11/2012 |
| WO | 2013117470 A1 | 8/2013 |
| WO | 2018001433 A1 | 1/2018 |

OTHER PUBLICATIONS

Torb En Nielsen: 11 Wind direction sensor 1-17 alignment 11, Prior Art Publishing, Apr. 29, 2016 (Apr. 29, 2016), XP040673131, ISBN: 978-3-945188-36-1.
Danish Patrent and Trademark Office First Technical Exarnaination for Application No. PA 2016 70480 dated Jan. 24, 2017.
PCT Written Opinion of the International Searching Authority for Application No. PCT/DK2017/050218.
Chinese Office Action for Application No. 20178005789.7 dated Nov. 18, 2019.
Intellectual Property India, First Examination Report for Application: 201917000288, dated Nov. 24, 2020.

* cited by examiner

DETERMINING WIND DIRECTION OFFSET USING YAW EVENTS

FIELD OF THE INVENTION

The present invention relates to a method of controlling a wind turbine, the wind turbine comprising a wind direction sensor, a yawing system, and a control system for yawing the wind turbine rotor relative to the wind with the aim of controlling the wind turbine optimally under different and changing wind directions. The invention furthermore relates to control system for performing the control method and a wind turbine comprising such control system.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

In order to optimize the power production and reduce the loads of the turbine it is important to know the right relative wind direction of the free flow wind. Most often the wind direction is measured by a wind direction sensor such as a wind vane placed on top of the nacelle and the wind turbine rotor is then continuously yawed to face the wind. If the wind direction measurements are off even by one or a few degrees, the resulting misalignment of the turbine rotor may cause increased and different loadings on the wind turbine blades than anticipated, and thereby increased wear and fatigue on the blades, blade root connections, bearings etc.

Further, a misalignment of the turbine rotor causes a non-negligible reduction in the power production over time.

The measurements from a wind direction sensor may however far from always be accurate for one reason because the rotor disturbs the free flow wind before reaching the wind sensor.

One way to compensate for this problem is by calibrating the wind vane measurements by a basic set of offset parameters. These parameters are typically found on a prototype turbine by comparing the measurements from the wind sensors on the turbine with measurements from a nearby Met Mast. Hereby the wind vane is calibrated such that the wind vane detects a relative wind direction of 0 degrees when the nacelle is turned directly up against the wind.

However, it has surprisingly been found that a wind sensor calibrated in this way is still not always accurate in that the wind directions different from 0 degrees may still be measured inaccurately. In other words, the wind direction sensor may still show an error in the relative wind direction measurement when the wind turbine is not pointing directly upwind. Further, this error in the wind direction measurements has been seen to not simply be off by a constant value, but to be off by a value depending on the rotor operation (and thereby depending on the wind speed), and by a parameter depending on how and from where the wind passes the rotor.

For some turbines and seemingly occasioned by an increased rotor size, this error has been seen to be even more pronounced. In case the wind direction sensor measures too high values of the relative wind directions, such error may cause the wind turbine to yaw back and forth on either side of the actual wind direction. In addition to the non-optimal controlling of the wind turbine, such yawing causes highly increased wear on the yawing components in addition to the non-optimal positioning of the rotor in the wind.

To correct for this effect it has been proposed to use a nearby reference measurement like a METmast or LIDAR and then compare the relative wind direction given by the reference with the measurement from the wind direction sensors behind the rotor. The measured wind direction can then be corrected by making a transfer function between the measured wind direction by the wind sensors on the turbine and the reference measurement. It has however been found that such transfer function is very dependent on the turbine type and on the rotor size. There may further even be variations from turbine to turbine and from site to site.

Generating such transfer function is therefore both very time consuming and expensive as it requires a nearby METmast or a LIDAR for all the different variants of wind turbines.

OBJECT OF THE INVENTION

It is an object of embodiments of the present invention to provide a control method for a wind turbine which obviate or reduce some of the above mentioned problems in known controlling methods.

It is therefore an object of embodiments of the present invention to overcome or at least reduce some or all of the above described disadvantages of the known wind direction measurements by providing a wind turbine controlling method of improved yawing and reduced risk of misalignment of the wind turbine rotor.

A further object is to establish win direction correction parameters without the need for measurements from any nearby METmast or a LIDAR.

It is a further object of embodiments of the invention to provide a method of improving the wind direction measurements obtained by conventional wind direction sensors and to provide a method of calibrating measurements from a wind direction sensor which may be implemented on existing equipment.

It is a further object of the invention to provide a control method for a wind turbine increasing the annual energy production (AEP) of the wind turbine while preferably reducing the fatigue loading or wear on the turbine due to misalignment of the rotor in the wind or unnecessary yawing.

So, in a first aspect the present invention relates to a method of controlling a wind turbine, the wind turbine comprising a wind direction sensor for measuring a wind direction parameter indicative of the wind direction relative to the wind turbine, a yawing system, and a control system for yawing the wind turbine rotor relative to the wind. The method comprises:

measuring a first wind direction parameter by the wind direction sensor;

performing a yaw event comprising the steps of determining a control parameter of the wind turbine as a function of the wind direction parameter, wherein the control parameter comprises a yawing parameter for the wind turbine, and controlling the wind turbine according to the control parameter, wherein the controlling comprises yawing the wind turbine according to the yawing parameter;

measuring a wind direction parameter by the wind direction sensor after said yawing event;

determining a data set comprising the first wind direction parameter, a wind direction sensor angle determined as a difference in the measured wind direction parameter before and after the yawing event, and a yaw angle indicative of the yawing performed during the yawing event;

obtaining over time a group of data sets;

determining a wind direction offset from the group of data sets;

adjusting the wind direction parameter as a function of the wind direction offset, and applying the adjusted wind direction parameter in the controlling of the wind turbine.

Hereby is obtained a simple yet effective control method improving the yawing of the wind turbine and reducing the risk of misaligning the rotor relative to the wind, as the yawing is based on more accurate information on the wind direction. This is obtained by the adjusting of the measured wind direction by the wind direction offset whereby any rotor effects on the wind direction sensor is accounted for ensures an accurate wind direction measurement also when the wind is not coming directly in front.

Furthermore is obtained a simple and effective control method for increasing the performance such as the annual energy production (AEP), as the yawing is adjusted to obtain a better alignment of the rotor to the wind as actually experienced by the rotor. Also, the wind turbine is better protected as a more precise alignment of the rotor to the free wind generally results in better control of the loads on the wind turbine blades and reduced wear on components. Further, the improved accuracy of the wind direction measurements especially of wind directions at an angle to the rotor reduces the risk of overcompensating the yawing having the rotor yawing too much in each yaw step.

It has been found that the wind direction measurements used to determine the optimal orientation of the wind turbine can advantageously be adjusted based on an offset according to the proposed method. The measured wind direction is adjusted as a function of a wind direction offset which is determined by comparing the measured wind direction before and after a yaw event to the yawing performed during the yaw event. In this way a change in the wind direction as measured by the sensor and as performed by the wind turbine are detected and the future wind direction measurements adjusted as a function hereof. Hereby is compensated for the error or inaccuracy of the relative wind direction measurement when the turbine is not pointing directly upwind and for the free wind flow having been changed by the rotor.

The proposed control method wherein the measured wind parameter is adjusted has been seen to yield a more robust and stable control method where the risk of unintentional increased or more or less abrupt switching between different yaw positions has been significantly reduced or even removed. In this way, the earlier mentioned problem of switching between too large positive and negative yaw directions on either side of the wind direction, which has been seen to occur on some rotor types due to the rotor somehow affecting the wind flow to be measured at the wind sensor position as higher than the free wind, has been seen to be avoided. This effect is obtained because the adjusting of the measured wind direction takes into account how the rotor influences the wind flow and thereby the sensor measurements when the rotor is not pointing directly upwind and.

The wind direction offset is advantageously used to adjust the wind direction parameter corresponding to an additional calibration of the wind direction sensor. The wind direction parameter is adjusted as a function of the wind direction offset, such as by a simple subtraction, as a gain factor, by a linear function or some other functions. Likewise the adjustment may be performed by a PI or PID control.

The adjusted wind direction parameter may preferably be applied in determining a yaw parameter for the wind turbine and the controlling of the wind turbine then comprises yawing the wind turbine according to the yawing parameter. Hereby the yawing parameter of the turbine is based on more accurate wind direction data improving the control of the wind turbine.

The adjusted wind direction parameter may alternatively or additionally be applied in determining other control parameters which to some extend depends on the wind direction, such as a pitch parameter of one or more of the rotor blades, and/or a rotational speed of the rotor.

The yaw event comprises determining a yawing parameter for the wind turbine and yawing the wind turbine accordingly. The yawing parameter is typically determined based on the wind direction as measured by one or more of the wind direction sensors. The yawing of the wind turbine may be performed in one or more steps. Typically, the yawing is performed at some predefined speed such as 0.3-1 degree per second. Yawing for example 6 degrees may therefore take in the order of 6-25 seconds. A yaw event may therefore comprise determining and re-determining a yaw parameter more times and yawing the wind turbine accordingly.

According to an embodiment, the yaw event comprises repeating the steps of determining a control parameter and controlling the wind turbine a number of times. The number of times may be a pre-defined number of times and/or corresponding to some pre-defined period of time.

In an embodiment of the invention, the steps are repeated until the measured wind direction parameter is within a pre-defined threshold of zero degrees. Normally, the wind direction sensor is calibrated to show a wind direction parameter of zero degrees when the wind turbine is pointing directly upwind. According to this embodiment, the yaw event is therefore continued until the wind turbine is facing upwind within a range of +/− the pre-defined threshold. Hereby the yaw angle indicative of the yawed angle reflects the actual relative wind direction before the yawing was initiated. This is then compared to how the wind direction sensor detects the same angle. The pre-defined threshold may be in the range of 0-5 degrees such as 1 degree, such as in the range of 0.2-0.6 degrees.

Further, continuing the yaw event until the measured wind direction parameter is within a pre-defined threshold of zero degrees is advantageous in indicating that the yawing parameter and yawing was successful.

The data set for a yaw event comprises data on the wind direction as measured before or as the yaw event was performed (the first wind direction parameter) as well as the wind direction sensor angle which is the difference in the measured wind direction before and after the yaw event i.e. the change in wind direction as detected by the wind direction sensor. The data set for a yaw event further comprises the yawed angle i.e. the amount of yawing performed in the yaw event. The wind direction parameter may be measured only before and after the yaw event or may additionally have been measured a number of times during the yaw event.

The wind direction offset is based on a group of data sets i.e. from a number of data sets from different yaw events. The group of data sets is obtained over time such as over a predetermined time period such as over a number of days, a week, or a month. Additionally or alternatively, the group of data sets is obtained over time such that a predetermined number of data sets are in the group. In this way the wind direction offset is determined based on a larger amount of data and determined more accurate and with a higher degree of certainty.

In an embodiment, the steps of obtaining a group of data sets and determining a wind direction offset are repeated at time intervals. In this way the wind direction offset may be updated from time to time such as for example every 3 months or the like and/or when changes have been made to the wind turbine which could affect the wind flow near the wind direction sensor. Hereby, seasonal changes can be taken into account and/or the potential influence from for example the mounting or replacement of equipment on the nacelle. Additionally or alternatively, the steps of obtaining a group of data sets and determining a wind direction offset may be repeated for a defined time period only.

In an embodiment, the steps of obtaining a group of data sets and determining a wind direction offset are repeated a predefined number of times such as for example 2-5 times. Hereby, the wind direction offset can be determined with greater certainty.

According to an embodiment of the invention, the method further comprises determining for each data set a difference between the yaw angle and the sensor angle and determining the wind direction offset as an average of the difference for the group of data. Hereby the wind direction offset expresses the average difference between a yaw angle and how this yawing is detected by the wind direction sensor. Hereby is obtained a wind direction offset for effectively adjusting the wind direction measurements to be more accurate also for relative wind directions other than zero degrees i.e. taking into account how the wind turbine rotor affects the free wind flow and causes relative wind changes when the wind is not directly upwind.

According to an embodiment, the control method further comprises obtaining a number of pre-defined wind direction intervals and obtaining a group of data and a wind direction offset for each wind direction interval, and wherein each data set is allocated to a group of data according to the first wind direction parameter in the data set. Hereby is obtained a number of wind direction offsets as a function of the size of the wind direction parameter. The wind direction parameter may then be adjusted as a function of the wind direction offset of the wind direction interval comprising the wind direction parameter at the time of adjusting.

Hereby is accounted for the wind flow being changed by the rotor differently in dependence on its direction when hitting the rotor. The adjustment according to this method have proven to be a good and effective means for the reducing or compensating for the inherent inaccuracy of the wind direction sensor measurements primarily caused by the free flow of the wind being changed by the rotor.

The predetermined intervals for the wind direction are preferably successive intervals but some may alternatively in an embodiment be partially overlapping. The intervals may be determined for example with a view to the dependency of the wind direction misalignment to the relative wind direction, such that smaller intervals are set in regimes where the wind direction correction changes more.

In an embodiment, 2, 3, 4, 5, 6, 7, or 8 different groups of data sets are made based on wind direction parameters within 2, 3, 4, 5, 6, 7, or 8 wind direction intervals, respectively. The more intervals the more refined the wind direction adjustment may be. The wind direction intervals may for example comprise the intervals from −12 to +12 degrees with steps of 3 degrees.

In an embodiment, the method further comprises obtaining a number of pre-defined wind speed intervals and obtaining a group of data and a wind direction offset for each wind speed interval, and wherein each data set is allocated to a group of data according to a wind speed at a time during the yaw event of the data set. The wind direction parameter may then be adjusted as a function of the wind direction offset of the wind speed interval comprising the wind speed at the time of adjusting. Alternatively, the wind direction parameter may be adjusted by an interpolation function between the wind direction offsets of the different wind speed intervals.

Similarly as for the wind direction intervals discussed above, the predetermined intervals for the wind speed are preferably successive intervals but some may alternatively in an embodiment be partially overlapping. The intervals may be determined for example with a view to the dependency of the wind direction misalignment to the wind speed, such that smaller intervals are set in regimes where the wind direction correction changes more.

In an embodiment, 2, 3, or 4 different or additional groups of data sets are made based on data sets within 2, 3, or 4 wind speed intervals, respectively. The more intervals the more refined the wind direction adjustment may be. The wind direction intervals may for example comprise the intervals of relatively low, medium, and high wind speeds such as from 0-6 m/s, 6-12 m/s, and 12-25 m/s.

In this way wind direction offsets may be determined for either of or both of different wind direction intervals and different wind speed intervals.

By determining a wind direction offset for a number of wind speed intervals is obtained a more precise method with improved accuracy better capturing that the wind direction is to be adjusted differently under different operating condition of the wind turbine and under different wind speeds.

The wind speed may be measured and/or estimated for example based on the power of the wind turbine.

In an embodiment, the adjusting of the wind direction parameter comprises subtracting or multiplying the wind direction offset times a gain factor smaller than one, wherein the gain factor is in the interval of 0.1-0.95, such as in the interval of 0.4-0.6, such as equal to 0.5.

Hereby too abrupt changes to the yawing are avoided and an improved convergence may be obtained.

In yet a further embodiment of the invention, the wind direction parameter is further adjusted as a function of earlier wind direction offsets, whereby abrupt changes to the wind direction parameter may be avoided and whereby switching back and forth between values may likewise be avoided. For example, the wind direction parameter may be adjusted by a subtraction of the wind direction offset, and further a subtraction of the change in wind direction offset from the last to the present adjustment and times a gain factor.

In a further aspect the present invention relates to a control system for a wind turbine configured to perform the steps of:
  receiving a first wind direction parameter as measured by
    a wind direction sensor, wherein the wind direction
    parameter is indicative of the wind direction relative to
    the wind turbine;
  performing a yaw event comprising the steps of determining a control parameter of the wind turbine as a
    function of the wind direction parameter, wherein the
    control parameter comprises a yawing parameter for
    the wind turbine, and controlling the wind turbine according to the control parameter, wherein the controlling comprises yawing the wind turbine according to the yawing parameter;

receiving a wind direction parameter as measured by the wind direction sensor after said yawing event;

determining a data set comprising the first wind direction parameter, a wind direction sensor angle determined as a difference in the measured wind direction parameter before and after the yawing event, and a yaw angle indicative of the yawing performed during the yawing event;

obtaining over time a group of data sets;

determining a wind direction offset from the group of data sets;

adjusting the wind direction parameter as a function of the wind direction offset, and applying the adjusted wind direction parameter in the controlling of the wind turbine.

In a further aspect the present invention relates to a wind turbine comprising a control system according to the above.

The advantages of the control system and the wind turbine comprising such control system are as described in relation to the control method in the previous.

BRIEF DESCRIPTION OF THE DRAWINGS

In the following different embodiments of the invention will be described with reference to the drawings, wherein.

DETAILED DESCRIPTION OF THE DRAWINGS

Figure 1:
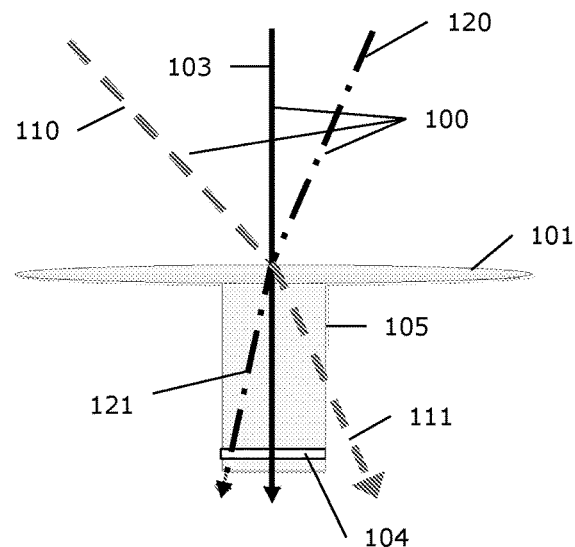
FIG. 1 illustrates the change in wind direction when the free flow passes through a wind turbine rotor.

FIG. 1 illustrates the change in wind direction when the free flow 100 passes through a wind turbine rotor 101. If the rotor 101 is turned directly in to the wind as illustrated by the solid black line 103, a wind direction sensor 104 positioned on the nacelle 105 behind the rotor 101 when calibrated will measure a wind direction of 0 degrees. However, if the wind is not directly upwind, the wind flow 100 is affected by the rotor 101 and is affected differently depending on the direction of the incoming wind. Therefore, the wind sensor 104 may detect the wind direction inaccurately. The figure illustrates how an incoming wind at approximately 45 degrees, 110, may be measured as being only 30 degrees, 111, even though the wind sensor has been calibrated. Similarly, an incoming wind of approximately −20 degrees, 120, may be measured as being approximately −10 degrees, 121.

As mentioned above, the wind direction sensors 104 are generally calibrated for example by sets of predetermined calibration parameters such that the sensors yield a calibrated relative wind direction of 0 degrees when the rotor is turned directly upwind. The way the wind turbine rotor affects the wind flow depends on the type of wind turbine rotor.

However, it has been observed that the calibrated wind sensor shows an error in its relative wind direction measurements when the wind turbine is not pointing directly upwind. In many cases the wind sensors have been found to yield relative wind directions smaller than the actual relative wind direction (such as illustrated in FIG. 1). In such cases, the inaccuracy of the wind sensor reported here may not be noticed as this could result in the wind turbine being yawed less than optimal and the wind turbine needing more yawing steps to be turned into the wind. It can however also result in, that a bigger yaw error is required before starting yawing upwind, and even worse that an extreme yaw error event may not be detected. For instance if the wind is suddenly changing 30 degrees some pitching of the blades is needed to minimize the loads. But if only 20 degrees are measured, the load reduction activities would not be initiated on the event.

In some case and for some rotor types, the rotor has been seen to affect the wind flow in such a way that the wind sensors yield relative wind directions larger than the actual relative wind direction. This may however be critical to the controlling of the wind turbine and lead to critical loads and wear especially on the yawing system, as the control system may then tend to yaw the rotor too much and causing the rotor to be yawed back and forth without obtaining the desired yaw direction of the rotor pointing directly into the wind.

Figure 2:
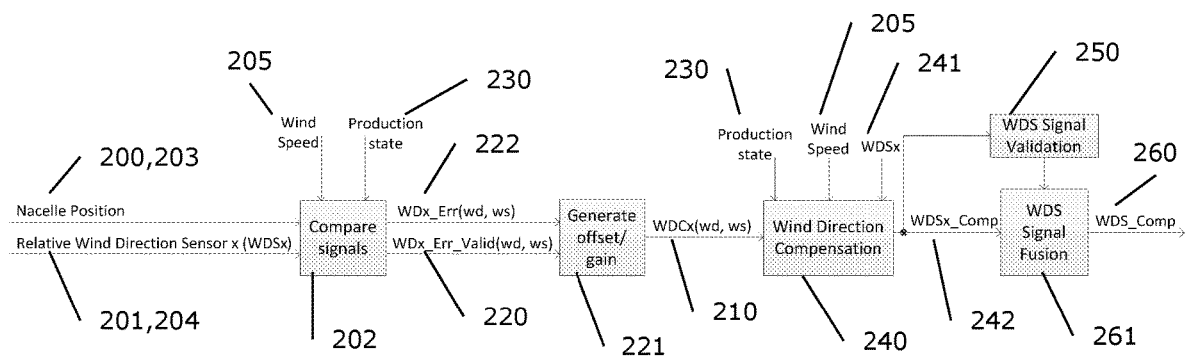
FIG. 2 illustrates the functionality of the control method according to an embodiment of the invention.
Figure 4:
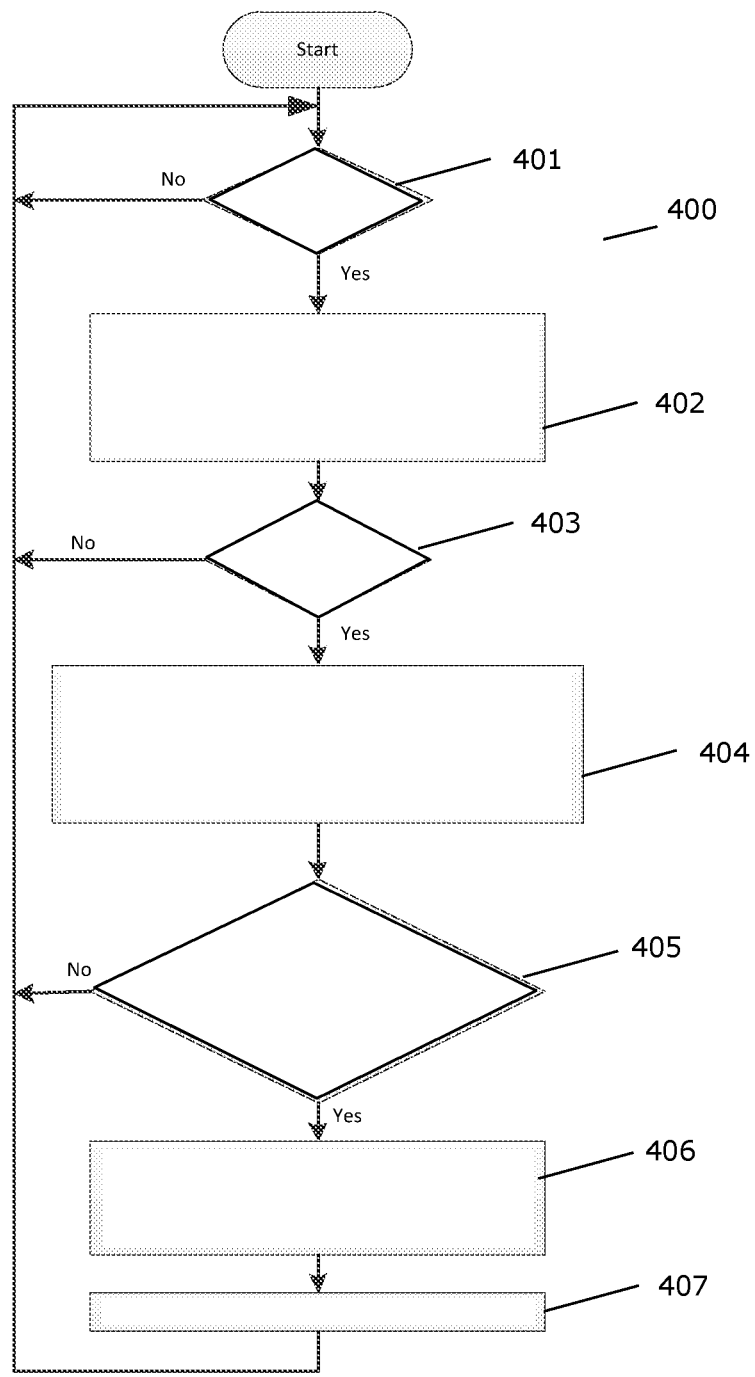
FIG. 4 is a flow chart illustrating an embodiment of the invention.

This inaccuracy of the wind sensor measurements is removed or at least reduced by the method according to the invention by adjusting the already calibrated relative wind direction by wind direction offsets which are determined according to the method as illustrated in FIG. 2 and in the flow chart of FIG. 4. Hereby is obtained a calibrated and adjusted relative wind direction, which is then used in the control of the wind turbine.

An overview of the functionality of the control method is shown in FIG. 2.

Figure 3:
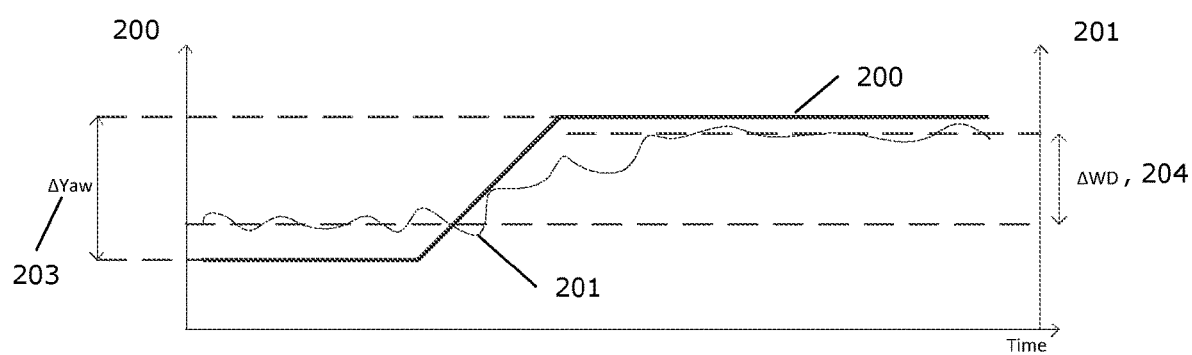
FIG. 3 shows an example of the difference in yawed angle and measured relative wind direction over time and during a yaw event.

The relative wind direction parameter 201 indicative of the wind direction relative to the wind turbine and from each wind sensor is continuously measured and filtered to reduce the effect of a passing blade in front of the sensor. When the turbine is yawing the filtered relative wind direction (the first wind direction parameter) just before the turbine start yawing is compared to the filtered relative wind direction just after the yawing, 202. The nacelle orientation of the wind turbine 200 is detected and the angle that the turbine has yawed (the yaw angle) 203 is then compared with the change in measured relative wind direction before and after the yawing (the wind direction sensor angle, ΔWD, 204). An illustration of this is shown in FIG. 3. So if for instance the wind direction parameter 201 is measured to be +6 degrees (ΔWD) and the turbine needs to yaw 9 degrees (ΔYaw, 203) before the relative wind direction is approximately 0 degrees. Then there is a factor of 1.5 between the measured relative wind direction at 6 degrees and the real wind direction. A wind direction offset of +3 degrees when measuring +6 degrees can also be added instead.

The wind direction offset 210 can be different for different measured wind direction parameter 201 and also for different wind speeds, 205.

Referring to FIG. 2, the control method comprises for each time the turbine is yawing collecting a set of data is in the "Compare Signal" block 202. The set consists of the yawed angle (ΔYaw, 203) and the change in relative wind direction (ΔWD, 204) from just before the yawing was started and just after it was ended. The data set is then evaluated to check if the data set is usable, 220. If the data is usable a running average of ΔYaw, 203 and ΔWD, 204 will be stored in a group of data that may depend on one or more of the first wind direction parameter, 201, the wind speed 205, and the production state (Production or Idle/Stopped, 230) of the turbine. The group of data sets could for instance be for a number of wind direction intervals within −12 to +12 degrees with step of 3 degrees. Groups of data sets could alternatively or additionally be formed for different wind speed intervals like for example from 0-6 m/s, 6-12 m/s, and 12-25 m/s. The number of data sets in each group may also be stored.

When then number of samples or data sets in a given group reaches a predetermined number, a signal "WDx_Err_Valid(wd, ws)" for that group is sat, 220. Then the "Generate offset" block, 221 can use the group data sets 222 for generating a wind direction offset "WDCx(wd, ws)", 210 for the given group. The wind direction offset 210, "WDCx(wd, ws)" may be determined from the difference between the average Yawed angle minus the average change in relative wind direction for the given group (WDx_Err(wd, ws)=avg (ΔYaw)−avg(ΔWD)). In the "Generate offset/gain" block, 221 a controller generates a Wind Direction offset "WDCx (wd, ws)", 210 for the given wind direction and wind speed interval. This wind direction offset can for instance be the "WDx_Err(wd, ws)" for the given interval(s) times a gain factor (for example in the range of 0.2-1.0). When a wind direction offset is generated for a given wind direction interval and/or wind speed interval, the "WDx_Err_Valid (wd, ws)" and "WDx_Err(wd, ws)" signals for that interval(s) are cleared. The number of data sets for the given group is also cleared and the collection of data sets for that group can start over again.

In the "Wind Direction Compensation" block, 240 in FIG. 2 the wind direction signals "WDSx", 241 from the one or more wind direction sensors are adjusted or compensated "WDSx_Comp", 242 based on the wind direction offset "WDCx", 210 for the current measured wind speed, 205 and for the measured wind direction "WDSx", 241 (which determine the relevant wind direction offset from among the wind direction offsets for the different wind direction and wind speed intervals). This is done for each wind direction sensor "x". The compensation can be performed based on an interpolation between the wind direction offsets for the different wind speed intervals to obtain a more smooth adjustment.

Based on a validation "WDS Signal Validation", 250 of each of the adjusted "WDSx_Comp" signals 242 for the number of wind direction sensors, the adjusted signals will be fused to a single wind direction signal "WDS_Comp" 260 in the "WDS Signal Fusion" block, 261.

This is also illustrated in the flowchart diagram 400 for the process to generate the wind direction offset for a given wind direction sensor x and as performed in a control system of a wind turbine according to the invention as shown in FIG. 4.

If a yaw event is performed at block 401 ("Yes"), at block 402 the yawed angle is stored along with the relative wind direction just before the yawing (the first wind direction parameter), and the change in the measured relative wind direction from just before to just after the yawing (the wind direction sensor angle). The data set thus obtained is then validated at block 403, and if found to be usable ("Yes") then grouped at block 404. The grouping is performed based on the first wind direction parameter and optionally the wind speed. Further, for the group an average of the difference between the yaw angle and the wind direction sensor angle is updated. At block 405, it is determined if the group is based on a sufficient number of data sets. If this is the case ("Yes"), a wind direction offset for the given group is determined at block 406 as the average of the difference between the yaw angle and the wind direction sensor angle. This wind direction offset is then used to adjust the wind direction measurements preferably times some gain factor to make the adjustment more robust. The group of data sets for the given wind direction interval and wind speed interval is then cleared and optionally ready for a redetermination of a wind direction offset at block 407.

Figure 5:
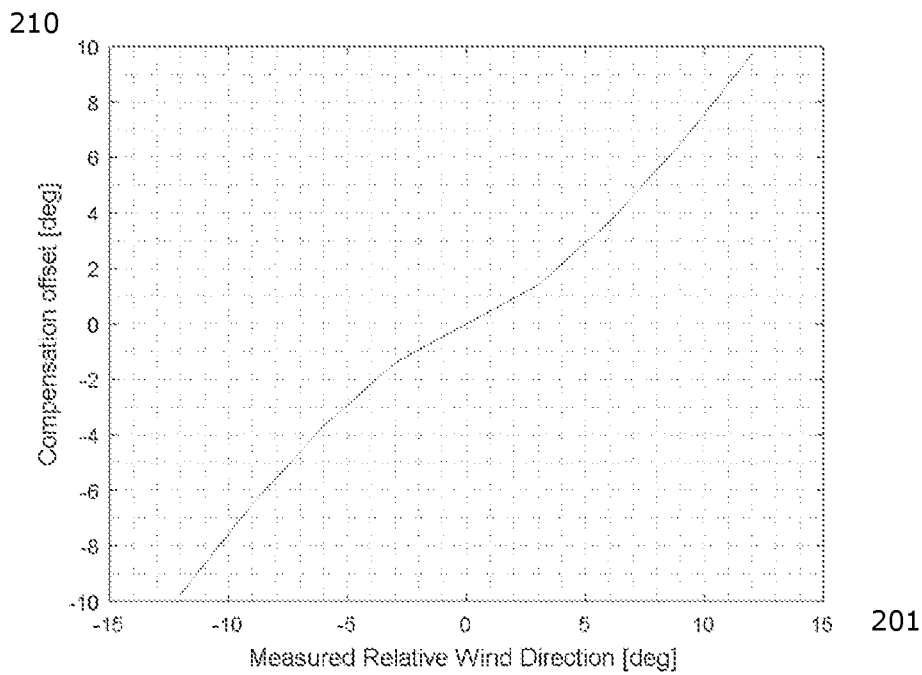
FIG. 5 shows an example of wind direction offset for different wind direction as measured by a wind direction sensor and according to embodiments of the invention.

FIG. 5 shows the wind direction offsets 210 determined according to an embodiment of the invention and as a function of the relative wind direction measured by a wind direction sensor, 201. A number of wind direction offsets have here been determined for a number of different wind direction intervals and then interpolated in between. It is noted that the wind direction offset is 0 degrees for a measured wind direction of 0 degrees, corresponding to the wind direction sensor having been calibrated to correctly detect an incoming wind of 0 degrees. However, the figure clearly illustrate that the wind direction sensor does not measure the wind at other angles correctly as the determined wind direction offsets are relatively significant.

Figure 6:
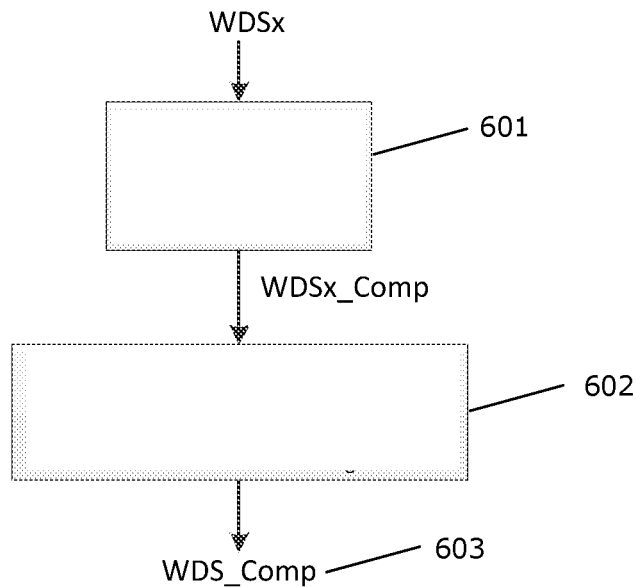
FIG. 6 illustrates a compensation and fusion of the wind direction signals from different sensors.

FIG. 6 is a flowchart illustrating a compensation and fusion of the wind direction signals from different sensors. The wind direction signal for a sensor x is first compensated based on the wind direction offset for the relevant wind direction interval and wind speed interval based on the current relative wind direction and wind speed, 601. The hereby compensated wind direction signals from each of the different wind direction sensors are then fused, 602 to a single relative wind direction signal, 603. This may for example be performed based on a simple averaging and/or based on the current quality of each of the wind direction sensors.

For example, some sensors may be known to perform poorly at very low temperatures and are therefore disregarded in the fusing when the temperature is low.

The invention claimed is:
1. A method of controlling a wind turbine, the method comprising:
obtaining a plurality of data sets corresponding to a plurality of yaw events, wherein each yaw event of the plurality of yaw events comprises:
determining a first value of a wind direction parameter;
determining a yaw parameter of the wind turbine as a function of the wind direction parameter;
controlling a yawing system of the wind turbine according to the yaw parameter, wherein the wind turbine is yawed by a yaw angle;
determining a second value of the wind direction parameter after the wind turbine is yawed by the yaw angle; and
determining a respective data set of the plurality of data sets that corresponds to the yaw event, wherein the data set comprises the wind direction parameter, a first difference between the first value and the second value of the wind direction parameter, and the yaw angle;
determining a wind direction offset using the plurality of data sets;
adjusting values of the wind direction parameter as a function of the wind direction offset; and controlling the wind turbine according to the adjusted values of the wind direction parameter.

2. The method of claim 1, further comprising:
determining, for each data set of the plurality of data sets, a second difference between the yaw angle and the first difference,
wherein determining the wind direction offset comprises determining an average of the second differences for the plurality of data sets.

3. The method of claim 1, wherein each yaw event comprises multiple instances of determining the yaw parameter and controlling the yawing system.

4. The method of claim 3, wherein determining the yaw parameter and controlling the yawing system are repeated until the second value of the wind direction parameter is within a pre-defined threshold of zero degrees.

5. The method of claim 1, wherein determining the wind direction offset comprises determining a plurality of wind direction offsets corresponding to a plurality of pre-defined wind direction intervals, and wherein each data set is allocated to a wind direction interval according to the first value of the wind direction parameter in the data set.

6. The method of claim 5, wherein adjusting values of the wind direction parameter comprises, for each of the values:
determining which wind direction interval of the plurality of wind direction intervals comprises the value; and
applying the wind direction offset corresponding to the wind direction interval.

7. The method of claim 1,
wherein obtaining a plurality of data sets comprises obtaining a respective plurality of data sets for each wind speed interval of a plurality of pre-defined wind speed intervals,
wherein determining the wind direction offset comprises determining a plurality of wind direction offsets corresponding to the plurality of pre-defined wind speed intervals, and
wherein each data set is allocated to a respective wind speed interval according to a wind speed at a time during the yaw event of the data set.

8. The method of claim 7, wherein adjusting values of the wind direction parameter comprises, for each of the values:
applying the wind direction offset corresponding to the wind speed interval comprising a wind speed at the time of adjusting.

9. The method of claim 7, wherein adjusting values of the wind direction parameter comprises:
applying an interpolation function between the wind direction offsets corresponding to different wind speed intervals.

10. The method of claim 1, wherein obtaining the plurality of data sets occurs during a predetermined time period.

11. The method of claim 1, wherein obtaining the plurality of data sets occurs according to a predetermined number of data sets.

12. The method of claim 1, wherein multiple instances of obtaining the plurality of data sets and determining the wind direction offset are performed according to a time interval.

13. The method of claim 1, wherein obtaining the plurality of data sets and determining the wind direction offset are performed a predefined number of times.

14. The method of claim 1, wherein adjusting values of the wind direction parameter comprises subtracting the wind direction offset.

15. The method of claim 1, wherein adjusting values of the wind direction parameter is also a function of one or more previous wind direction offsets.

16. The method of claim 1, wherein determining each of the first value and the second value of the wind direction parameter comprises:
obtaining a measurement using a wind direction sensor of the wind turbine.

17. The method of claim 1, wherein adjusting values of the wind direction parameter comprises subtracting a product of the wind direction offset and a gain factor smaller than one.

18. The method of claim 17, wherein the gain factor is in the interval of 0.1-0.95.

19. A control system for a wind turbine, the control system comprising:
a controller configured to perform an operation comprising:
obtaining a plurality of data sets corresponding to a plurality of yaw events, wherein each yaw event of the plurality of yaw events comprises:
receiving, from a sensor of the wind turbine, a first value of a wind direction parameter;
determining a yaw parameter of the wind turbine as a function of the wind direction parameter;
controlling a yawing system of the wind turbine according to the yaw parameter, wherein the wind turbine is yawed by a yaw angle;
receiving, from the sensor, a second value of the wind direction parameter after the wind turbine is yawed by the yaw angle; and
determining a respective data set of the plurality of data sets that corresponds to the yaw event, wherein the data set comprises the wind direction parameter, a first difference between the first value and the second value of the wind direction parameter, and the yaw angle;
determining a wind direction offset using the plurality of data sets;
adjusting values of the wind direction parameter as a function of the wind direction offset; and
controlling the wind turbine according to the adjusted values of the wind direction parameter.

20. A wind turbine, comprising:
a rotor;
a sensor configured to detect values of a wind direction parameter;
a yawing system configured to yaw the rotor; and
a control system configured to perform an operation, comprising:
obtaining a plurality of data sets corresponding to a plurality of yaw events, wherein each yaw event of the plurality of yaw events comprises:
measuring, using the sensor, a first value of the wind direction parameter;
determining a yaw parameter of the wind turbine as a function of the wind direction parameter;
controlling the yawing system according to the yaw parameter, wherein the wind turbine is yawed by a yaw angle;
measuring, using the sensor, a second value of the wind direction parameter after the wind turbine is yawed by the yaw angle; and
determining a respective data set of the plurality of data sets that corresponds to the yaw event, wherein the data set comprises the wind direction parameter, a difference between the first value and the second value of the wind direction parameter, and the yaw angle;

determining a wind direction offset using the plurality of data sets;

adjusting values of the wind direction parameter as a function of the wind direction offset; and controlling the wind turbine according to the adjusted values of the wind direction parameter.

\* \* \* \* \*